(12) United States Patent
Wei et al.

(10) Patent No.: US 12,039,011 B2
(45) Date of Patent: Jul. 16, 2024

(54) INTELLIGENT EXPANSION OF REVIEWER FEEDBACK ON TRAINING DATA

(71) Applicant: International Business Machines Corporation, Armonk, NY (US)

(72) Inventors: Ke Wei Wei, Beijing (CN); Jun Wang, Yan Ta Zone (CN); Shuang YS Yu, Beijing (CN); Guang Ming Zhang, Beijing (CN); Yuan Feng, Beijing (CN); Yi Dai, BeiJing (CN); Ling Zhuo, Beijing (CN); Jing Xu, Xian (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 387 days.

(21) Appl. No.: 17/568,305

(22) Filed: Jan. 4, 2022

(65) Prior Publication Data

US 2023/0214454 A1     Jul. 6, 2023

(51) Int. Cl.
*G06V 10/00*     (2022.01)
*G06F 18/21*     (2023.01)
(Continued)

(52) U.S. Cl.
CPC ...... *G06F 18/2148* (2023.01); *G06F 18/2178* (2023.01); *G06F 18/231* (2023.01); *G06N 20/20* (2019.01)

(58) Field of Classification Search
CPC ........ G06N 20/00; G06N 20/20; G06N 20/10; G06N 5/01; G06N 7/01; G06F 18/2148;
(Continued)

(56) References Cited

U.S. PATENT DOCUMENTS 9,165,218 B2 * 10/2015 Simske ................ G06V 10/993
9,916,538 B2 *  3/2018 Zadeh .................... A61B 5/165
(Continued)

FOREIGN PATENT DOCUMENTS

WO     2018157387 A1    9/2018

OTHER PUBLICATIONS

Bigdeli et al., Incremental Anomaly Detection Using Two-Layer Cluster-based Structure, Information Sciences 429 (2018), pp. 315-331, Nov. 2017.
(Continued)

*Primary Examiner* — Amir Alavi
(74) *Attorney, Agent, or Firm* — Garg Law Firm, PLLC; Rakesh Garg; Nicholas Welling

(57) ABSTRACT

An embodiment generates an initial set of training data from monitoring data. The initial set of training data is generated by combining outputs from a plurality of pretrained classifiers. The embodiment trains a new classification model using the initial set of training data to identify anomalies in monitoring data. The embodiment performs a multiple-level clustering of the data samples resulting in a plurality of clusters of sub-clusters of data samples, and generates a review list of data samples by selecting a representative data sample from each of the clusters. The embodiment receives an updated data sample from the expert review that includes a revised target classification for at least one of the data samples of the expert review list. The embodiment then trains another replacement classification model using a revised set of training data that includes the updated data sample and associated revised target classification.

20 Claims, 8 Drawing Sheets

(51) Int. Cl.
*G06F 18/214* (2023.01)
*G06F 18/231* (2023.01)
*G06N 20/20* (2019.01)

(58) Field of Classification Search
CPC ...... G06F 18/231; G06F 18/23; G06F 18/254; G06F 18/2178; G06F 18/217; G06F 18/20; G06F 18/2433
See application file for complete search history.

(56) References Cited

U.S. PATENT DOCUMENTS

| | | | | |
|---|---|---|---|---|
| 10,140,972 | B2* | 11/2018 | Chen | G10L 15/06 |
| 10,169,445 | B2* | 1/2019 | Weinstein | G06F 18/2135 |
| 10,698,868 | B2* | 6/2020 | Guggilla | G06N 3/044 |
| 10,867,169 | B2* | 12/2020 | Zhuravlev | G06F 18/217 |
| 10,884,891 | B2 | 1/2021 | Awad et al. | |
| 11,195,057 | B2* | 12/2021 | Zadeh | G06N 3/006 |
| 11,386,301 | B2* | 7/2022 | Aggarwal | G06V 10/774 |
| 11,507,785 | B2* | 11/2022 | Glassman | G06N 20/20 |
| 11,704,315 | B1* | 7/2023 | Yan | G06F 16/906 707/718 |
| 11,914,674 | B2* | 2/2024 | Zadeh | G06N 3/084 |
| 2021/0319266 | A1* | 10/2021 | Chen | G06V 10/764 |

OTHER PUBLICATIONS

Theissler et al., VIAL-AD: Visual Interactive Labelling for Anomaly Detection—An approach and open research questions, Sep. 2020, Interactive Adaptive Learning 2020 co-located with ECML PKDD 2020.

Pimentel et al., Deep Active Learning for Anomaly Detection, Apr. 7, 2020.

Zhu et al., Tripartite Active Learning for Interactive Anomaly Discovery, Special Section on Advanced Software and Data Engineering for Secure Societies, vol. 7, May 7, 2019.

* cited by examiner

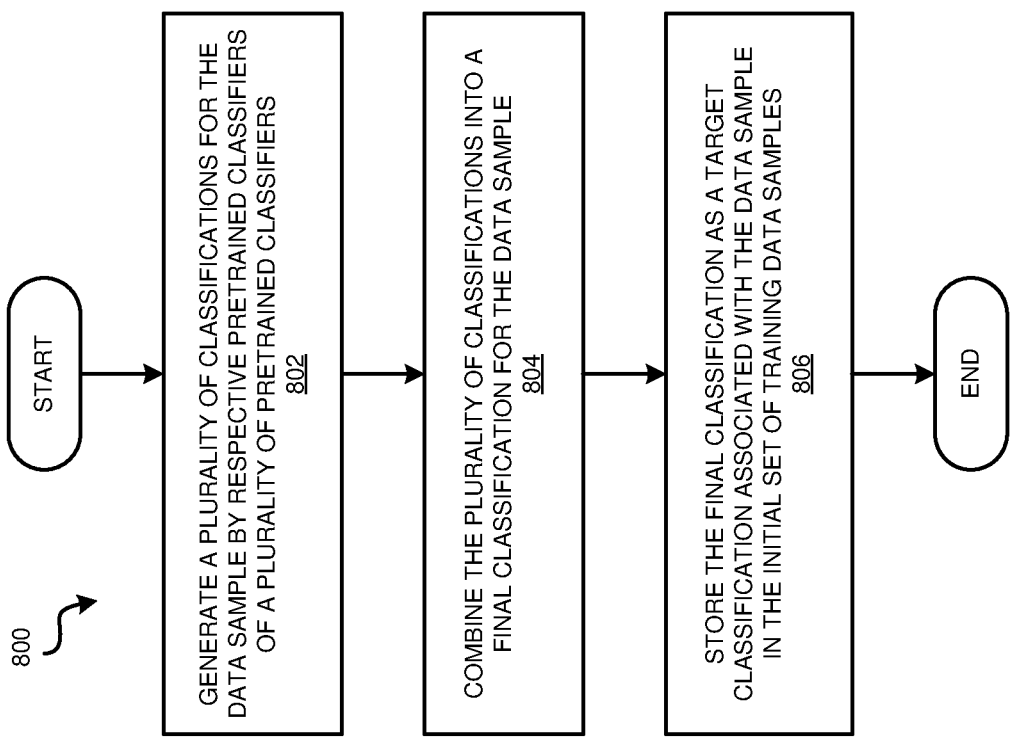

INTELLIGENT EXPANSION OF REVIEWER FEEDBACK ON TRAINING DATA

BACKGROUND

The present invention relates generally to a method, system, and computer program product for data processing. More particularly, the present invention relates to a method, system, and computer program product for intelligent expansion of reviewer feedback on training data.

Artificial intelligence (AI) technology has evolved significantly over the past few years. Modern AI systems include machine learning systems that are achieving human level performance on cognitive tasks like converting speech to text, recognizing objects and images, or translating between different languages. This evolution holds promise for new and improved applications in many industries.

An Artificial Neural Network (ANN)—also referred to simply as a neural network—is an example of a machine learning system that is often used for performing data classification tasks. ANNs are processing devices (algorithms and/or hardware) that are made up of a number of highly interconnected processing elements (nodes) that process information by their dynamic state response to external inputs. ANNs are loosely modeled after the neuronal structure of the mammalian cerebral cortex, but on much smaller scales. A large ANN might have hundreds or thousands of processor units, whereas a mammalian brain has billions of neurons with a corresponding increase in magnitude of their overall interaction and emergent behavior.

A machine learning system that performs data classification is sometimes referred to as a classifier. A classifier is a type of ANN that includes an algorithm that learns a function that separates two or more classes of data. There are many different types of classifiers. Examples include image classifiers that classify images based on what is being depicted (e.g., classifying images as depicting a cat or a dog) and sentiment classifiers that classify text based on what is being expressed (e.g., classifying text as expressing a positive or negative opinion).

A feedforward neural network is an ANN in which connections between the units do not form a cycle. A convolutional neural network (CNN) is an example of a feed-forward ANN that is sometimes used as a classifier. In a CNN, the connectivity pattern between the nodes (neurons) is inspired by the organization of the animal visual cortex, whose individual neurons are arranged to respond to overlapping regions tiling a visual field. As a result, CNNs are particularly efficient in recognizing image features, such as by differentiating pixels or pixel regions in a digital image from other pixels or pixel regions in the digital image. Generally, a CNN is designed to recognize images or parts of an image, such as detecting the edges of an object recognized on the image, for tasks such as image classification.

A recurrent neural network (RNN) is another example of a type of ANN that is sometimes used as a classifier. An RNN includes recurrent connections (i.e., feedback connections) that form cycles in the network's topology. In an RNN, a neuron feeds back information to itself in addition to passing it to the next neuron in the RNN. Computations derived from earlier inputs are fed back in the network, which gives an RNN a form of short-term memory. Feedback networks, such as RNNs, are dynamic in that the state of an RNN is continuously changing until it reaches an equilibrium point. For this reason, RNNs are particularly well-suited for detecting relationships across time in a given set of data. Long-Short Term Memory (LSTM) and Gated Recurrent Units (GRU) are types of RNNs that include a state-preserving mechanism through built-in memory cells. These types of RNNs are particularly well-suited for multivariate time series data analysis and forecasting, handwriting recognition, natural language processing, and task synthesis.

A deep neural network (DNN) is another example of an ANN that is sometimes used as a classifier. A DNN has multiple hidden layers of units between the input and output layers. Similar to shallow ANNs, DNNs can model complex non-linear relationships. DNN architectures generate compositional models where the object is expressed as a layered composition of image primitives. The extra layers enable composition of features from lower layers, allowing for the potential of modeling complex data with fewer units than a similarly performing shallow ANN.

In addition to neural networks, there are numerous other machine learning algorithms that are widely used in various applications. Some common examples include linear regression, logistic regression, and support vector machines (SVMs). Linear regression tries to fit a function to a set of input data points and is often used to project values, such as a future asset value or future price of a product. Logistic regression also tries to fit a function to a set of data points, but is typically used to classify data by predicting the likelihood of a data point belonging to a certain class. SVMs are used for both regression and classification, for example by fitting a hyperplane to datapoints and then classifying additional data points based on where they exist relative to the hyperplane. These are but a few examples of the many different machine learning algorithms in use today.

SUMMARY

The illustrative embodiments provide for intelligent expansion of reviewer feedback on training data. An embodiment includes generating an initial set of training data from a plurality of data samples from monitoring data, wherein the generating of the initial set of training data comprises, for each data sample of the plurality of data samples: generating a plurality of classifications for the data sample by respective pretrained classifiers of a plurality of pretrained classifiers, combining the plurality of classifications into a final classification for the data sample, and storing the final classification as a target classification associated with the data sample in the initial set of training data samples. The embodiment also includes training a first new classification model using the initial set of training data to identify anomalies in monitoring data. The embodiment also includes performing a multiple-level clustering of the plurality of data samples resulting in a plurality of clusters of sub-clusters of data samples. The embodiment also includes generating an expert review list of data samples with respective target classifications, where the generating of the expert review list comprises selecting for the expert review list a representative data sample from each of the plurality of clusters. The embodiment also includes receiving an updated data sample from the expert review that includes a revised target classification for at least one of the data samples of the expert review list. The embodiment also includes training a second new classification model as a replacement for the first new classification model using a revised set of training data that includes the updated data sample and associated revised target classification. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 8 depicts a schematic flow diagram of an alternative example of an initial training data generation process in accordance with an illustrative embodiment.

DETAILED DESCRIPTION

Figure 1:
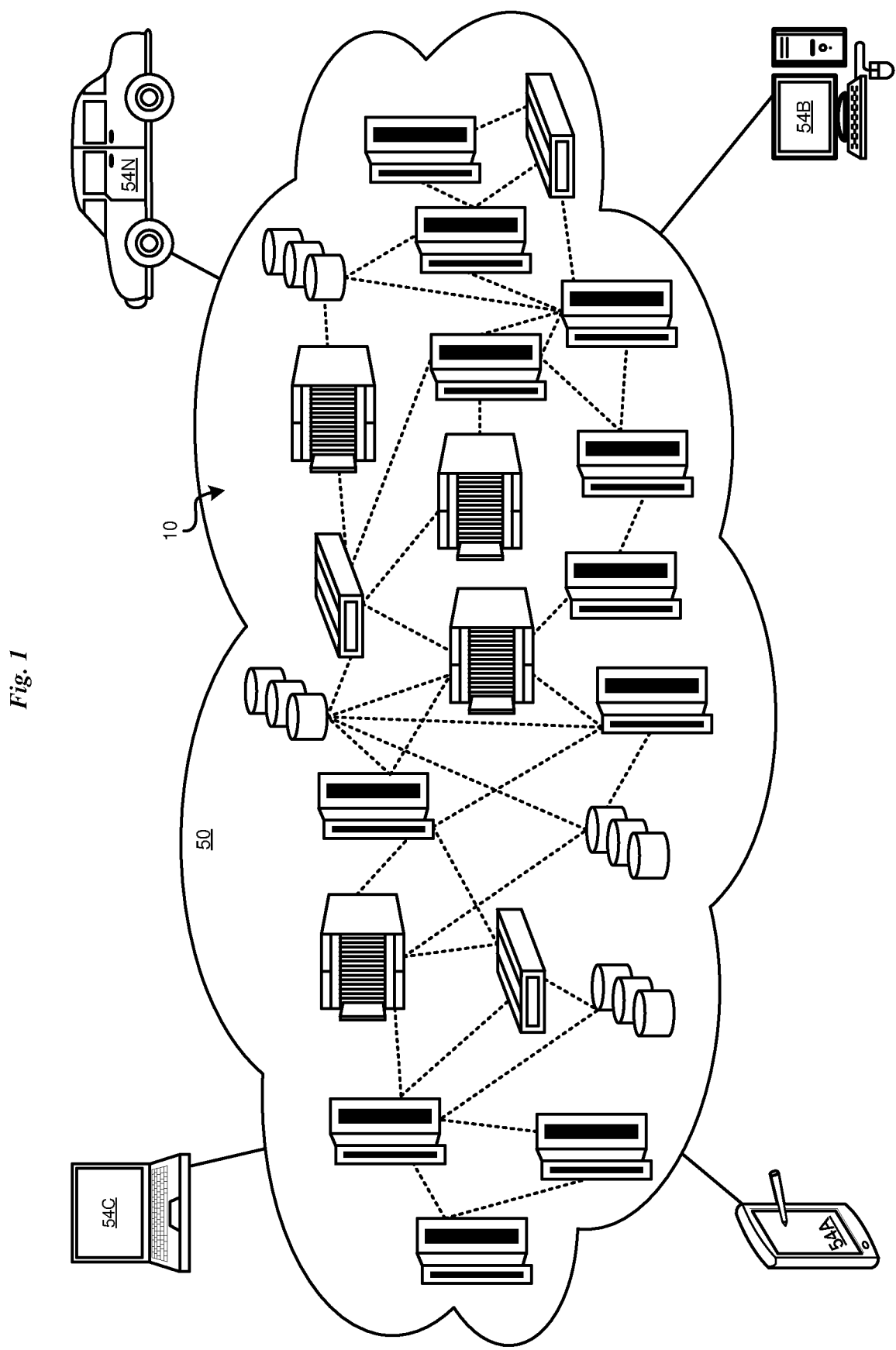
FIG. 1 depicts a cloud computing environment according to an embodiment of the present invention.

Anomaly detection refers to the task of detecting objects whose characteristics deviate significantly from the majority of the data. Anomaly detection is widely used in a variety of domains, such as intrusion detection, fault detection, system health monitoring, event detection in sensor networks, and so on. Anomaly detection includes detecting abnormal data that is likely to be a precursor to an event, such as a service disruption or a significant decline in performance, within a networked computing environment.

Cognitive anomaly detection means that the system uses machine learning techniques that allow the detection system to infer potentially damaging activities, whether of unintentional or malicious nature, without requiring the prior definition of the type and characteristics of these activities. Anomaly detection with machine learning is getting more and more attention with the increasing demand on system availability. However, given the complexity of IT application and systems environments, it is often very difficult to have a solution that can provide satisfactory levels of accuracy and efficiency.

As a result, existing solutions are often set to err on the side of issuing an alert, which results in an overabundance of false alerts. This overabundance of false alerts may obscure more serious situations that require attention. To avoid this problem, supervised training techniques are employed to fine-tune anomaly detection models and improve accuracy of the models. However, in many cases the monitoring data may be thousands or millions of log entries, which means that a human reviewer can quickly be overwhelmed with data to review. In many instances, it may simply not be feasible for expert reviewers to effectively provide the amount of feedback that is needed to improve the accuracy of the anomaly detection system. In some cases, the expert reviewers include IT professionals or IT management, who are already busy with other work and may find it difficult to find time to review the training data.

Aspects of the present disclosure address the deficiencies described above by providing mechanisms (e.g., systems, methods, machine-readable media, etc.) that receive monitoring data that is classified by an ensemble anomaly detection (AD) model and used as training data for an initial classifier model. The classifier model is trained with the training data, and then the outputs from the trained classifier are output to a multi-level clustering module. The multiple-level clustering forms clusters of related data samples. Then an expert review list of data samples with respective target classifications is generated by selecting a representative data sample from each of the plurality of clusters.

Exemplary embodiments allow a reviewer, such as a subject matter expert (SME), to review the expert review list of data samples and the respective target classifications determined by the classifier model during the training process. The reviewer is able to view and interact with the target classifications through a reviewer interface that displays the review list. The reviewer interface receives feedback from the reviewer, and the feedback from the reviewer is then applied to other data samples in the second-level cluster with the representative data sample. This allows the reviewer to review fewer than all data samples, and the system intelligently applies the reviewer feedback to closely related data samples, which reduces the workload on the reviewer while still improving the accuracy of the classification model.

In an embodiment, the process receives monitoring data, which is used for an initial set of training data that includes a plurality of data samples from the monitoring data. In some embodiments, the monitoring data includes one or more of health data, performance data, availability data, and security data. In some embodiments, the process generates an initial set of training data from a plurality of data samples from monitoring data. In some embodiments, the initial set of training data is generated using an ensemble AD model that includes a plurality of pretrained classifiers, such as pretrained anomaly detection classifiers. In some embodiments, the pretrained classifiers of the ensemble AD model include one or more of a gaussian mixture model (GMM), a support vector machine (SVMN) model, an isolation forest model, and a prophet model.

In some embodiments, the process generates a plurality of classifications for the data sample by respective pretrained classifiers of a plurality of pretrained classifiers. In some embodiments, the plurality of pretrained classifiers are included in an ensemble AD model. In some embodiments, the plurality of pretrained classifiers include one or more of a gaussian mixture model (GMM), a support vector machine (SVMN) model, an isolation forest model, and a prophet model. In some embodiments, the ensemble AD model generates a plurality of classifications for the data samples by respective classifiers of the ensemble AD model.

In some embodiments, the process combines the plurality of classifications into a final classification for the data sample. In some embodiments, the ensemble AD model combines the plurality of classifications into a final classification for the data sample. For example, in some embodiments, the ensemble AD model combines the plurality of classifications into a final classification by applying a majority voting algorithm to the plurality of classifications. In some embodiments, the process stores the final classification as a target classification associated with the data sample in the initial set of training data samples.

In some embodiments, the process trains a first new classification model using the initial set of training data to identify anomalies in reporting data. In some embodiments, the classification outputs from the classification model are output to a multi-level clustering module. In some embodiments, the process performs a multiple-level clustering of the plurality of data samples resulting in a plurality of clusters of sub-clusters of data samples.

There are many known approaches and algorithms for clustering that may be used to cluster the data samples. As a non-limiting example, in some embodiments, an unsupervised approach to clustering is used, such as k-means clustering. In some embodiments, a number of clusters is set by a user based on the number of classes of semantically-similar anomalies that the user expects there to be for each level of the multi-level clustering process. The k-means clustering process will then perform several iterations of selecting (e.g., by random selection) centers or centroids in a feature space for respective clusters, assigning each data sample to the closest center, and measuring the variance within each cluster and the separation of the clusters, then select new centers and cluster the data samples with the new centers, and so on. These iterations continue while the k-means clustering process attempts to minimize the variance of data in the clusters and maximize the separation of the clusters. The result is a set of clusters, which are used to create another clustering level (a level of sub clusters). For example, if 10 clusters are formed initially, then k-means is repeated (i.e., the multiple iterations of selecting centers and clustering the data samples is repeated) 10 times, once for each of the 10 clusters. In some embodiments, the k-means uses more stringent clustering criteria for the second level of clustering.

In some embodiments, the process generates an expert review list of data samples with respective target classifications by selecting a representative data sample from each of the plurality of clusters. In some embodiments, the process selects the representative data sample from each of the plurality of clusters by selecting a data sample at the center of each of the plurality of clusters. In some embodiments, the process excludes from the expert review list a data sample from a cluster that has already been reviewed by the expert reviewer, which is not applicable for the initial training, but will be applicable for subsequent iterations of this training process.

In some embodiments, the process includes providing the list to a reviewer interface, which renders the expert review list on a graphical user interface or display. The expert will review the data samples and indicate whether the classification by the classification model is correct or incorrect. If incorrect, the classification is corrected and provided to the reviewer interface as an updated data sample from the expert review.

In some embodiments, the process receives an updated data sample from the expert review that includes a revised target classification for at least one of the data samples of the expert review list. The updated data sample, which includes a revised target classification for a data sample, is received via the reviewer interface, and then provided to updated training data storage and made available for the updated training for a replacement classifier.

In some embodiments, the process trains a second new classification model as a replacement for the first new classification model. In some embodiments, the process uses a revised set of training data that includes the updated data sample and associated revised target classification to train the second new classification model.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, training data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
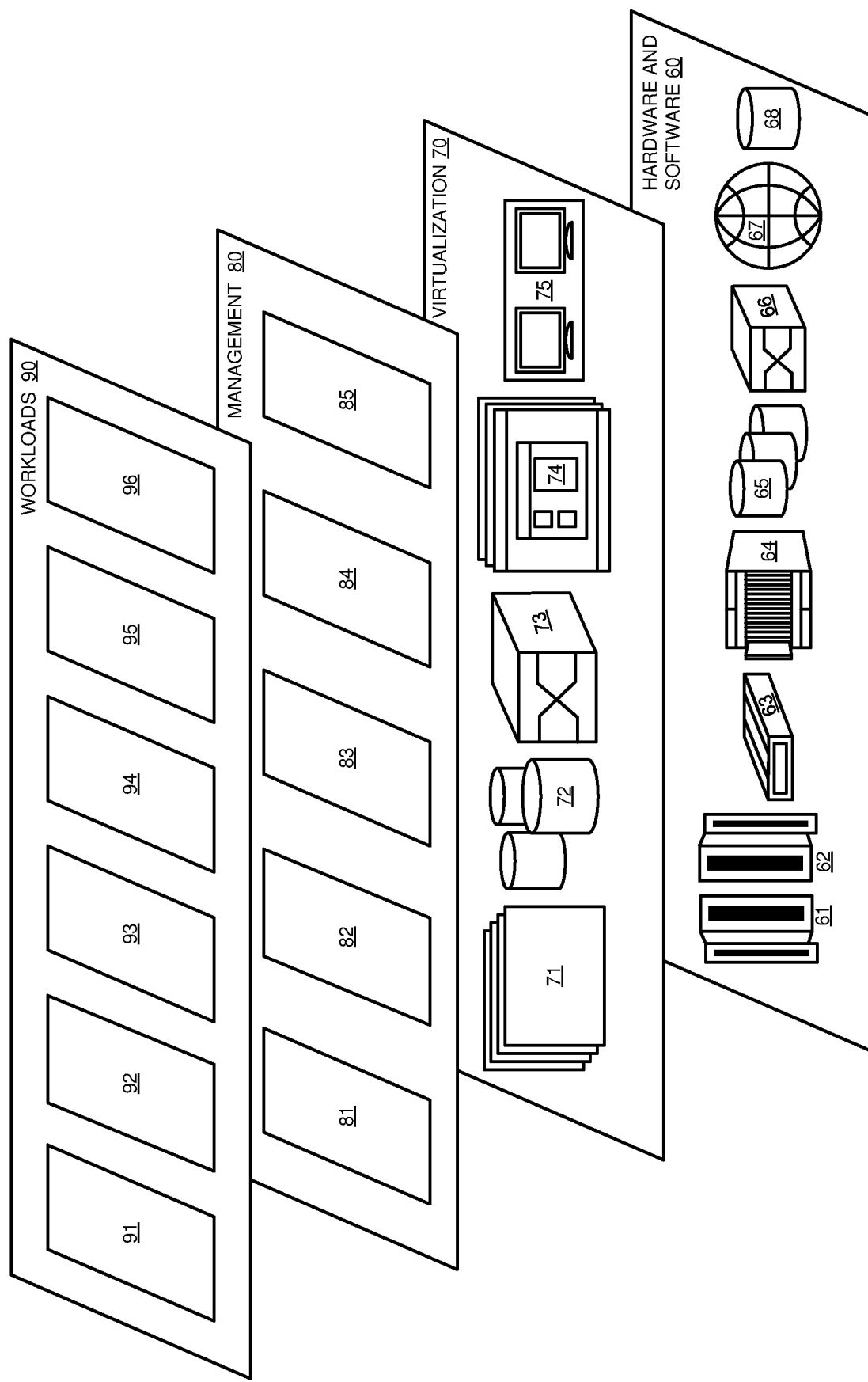
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in the context of the illustrated embodiments of the present disclosure, various workloads and functions 96 for system monitoring processing. In addition, workloads and functions 96 for system monitoring processing may include such operations as data analysis and machine learning (e.g., artificial intelligence, natural language processing, etc.), as described herein. In some embodiments, the workloads and functions 96 for system monitoring processing also works in conjunction with other portions of the various abstractions layers, such as those in hardware and software 60, virtualization 70, management 80, and other workloads 90 (such as data analytics processing 94, for example) to accomplish the various purposes of the disclosed embodiments.

Figure 3:
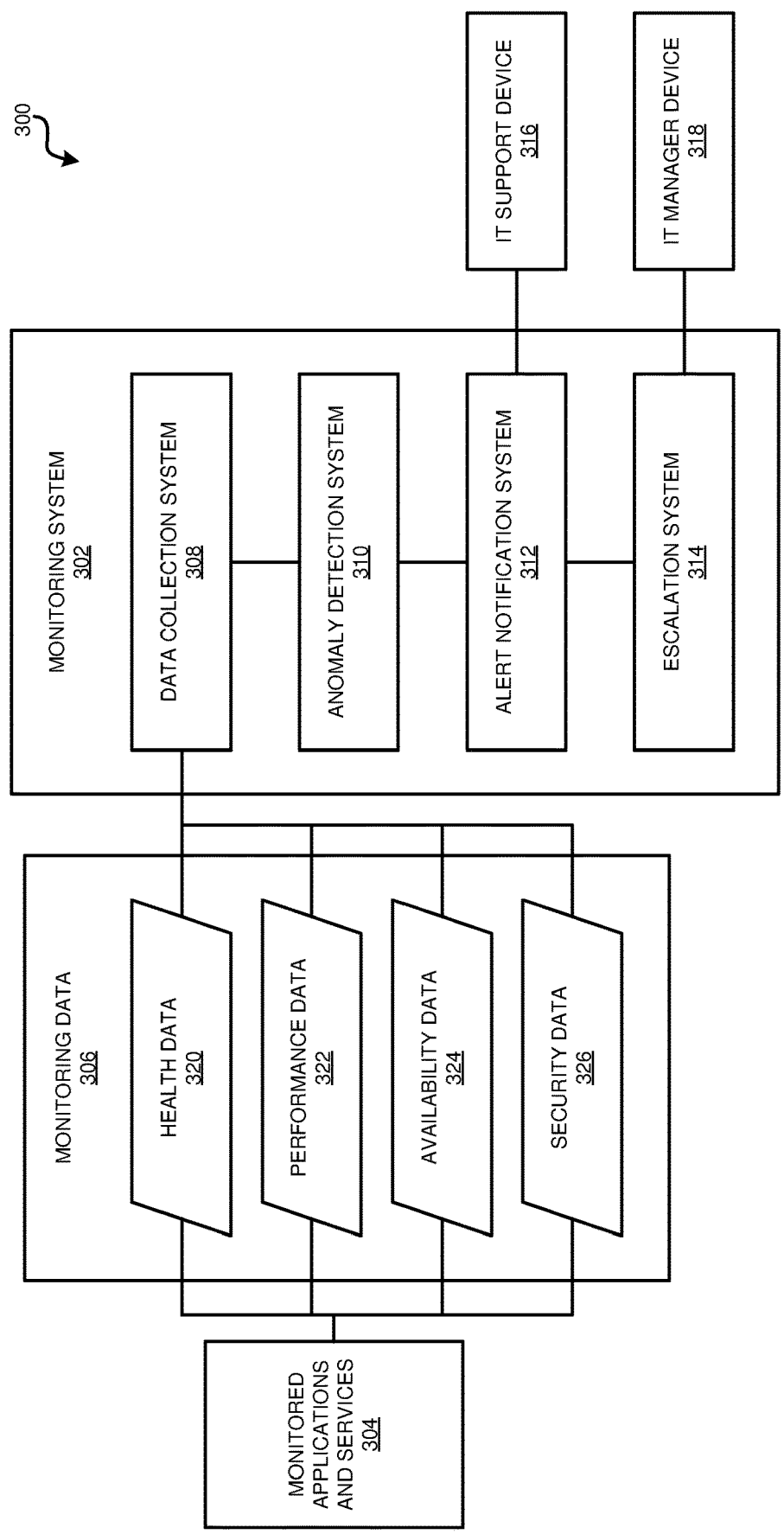
FIG. 3 depicts a block diagram of a system monitoring environment in accordance with an illustrative embodiment.

With reference to FIG. 3, this figure depicts a block diagram of a system monitoring environment 300 in accordance with an illustrative embodiment. In the illustrated embodiment, the system monitoring environment 300 includes a monitoring system 302. In some embodiments, the monitoring system 302 is deployed in workloads layer 90 of FIG. 2. By way of example, in some embodiments, the monitoring system 302 is implemented as system monitoring processing 96 in FIG. 2.

In the illustrated embodiment, the system monitoring environment 300 includes a data collection system 308, an anomaly detection system 310, an alert notification system 312, and an escalation system 314. In alternative embodiments, the system monitoring environment 300 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, a monitoring system 302 monitors various forms of monitoring data 306 that provides information indicative of the health and performance of various distributed applications and services 304, for example which may be operating in a cloud environment. If the monitoring system 302 detects anomalies in the monitoring data 302, the monitoring system 302 alerts IT support via IT support devices 316 and potentially escalates to IT management via IT manager device 318, where the devices 316 and 318 may include such things as smartphones, laptop computers, or other computing device.

In some embodiments, the monitoring data 306 may include such data as health data 320, performance data 322, availability data 324, and security data 326. The monitoring system 302 includes a data collection system 308 receives this monitoring data 306 and provides it to an anomaly detection system 310. In some embodiments, the anomaly detection system 310 is a machine learning based system that predicts classifications of the monitoring data as either an anomaly or not an anomaly. If the monitoring data is predicted to be an anomaly, then the alert notification system 312 issues an alert to IT support via IT support devices 316. In some embodiments, if IT support is unavailable or if the anomaly is indicated as being severe, the escalation system 314 escalates to the alert to IT management via IT manager device 318.

Figure 4:
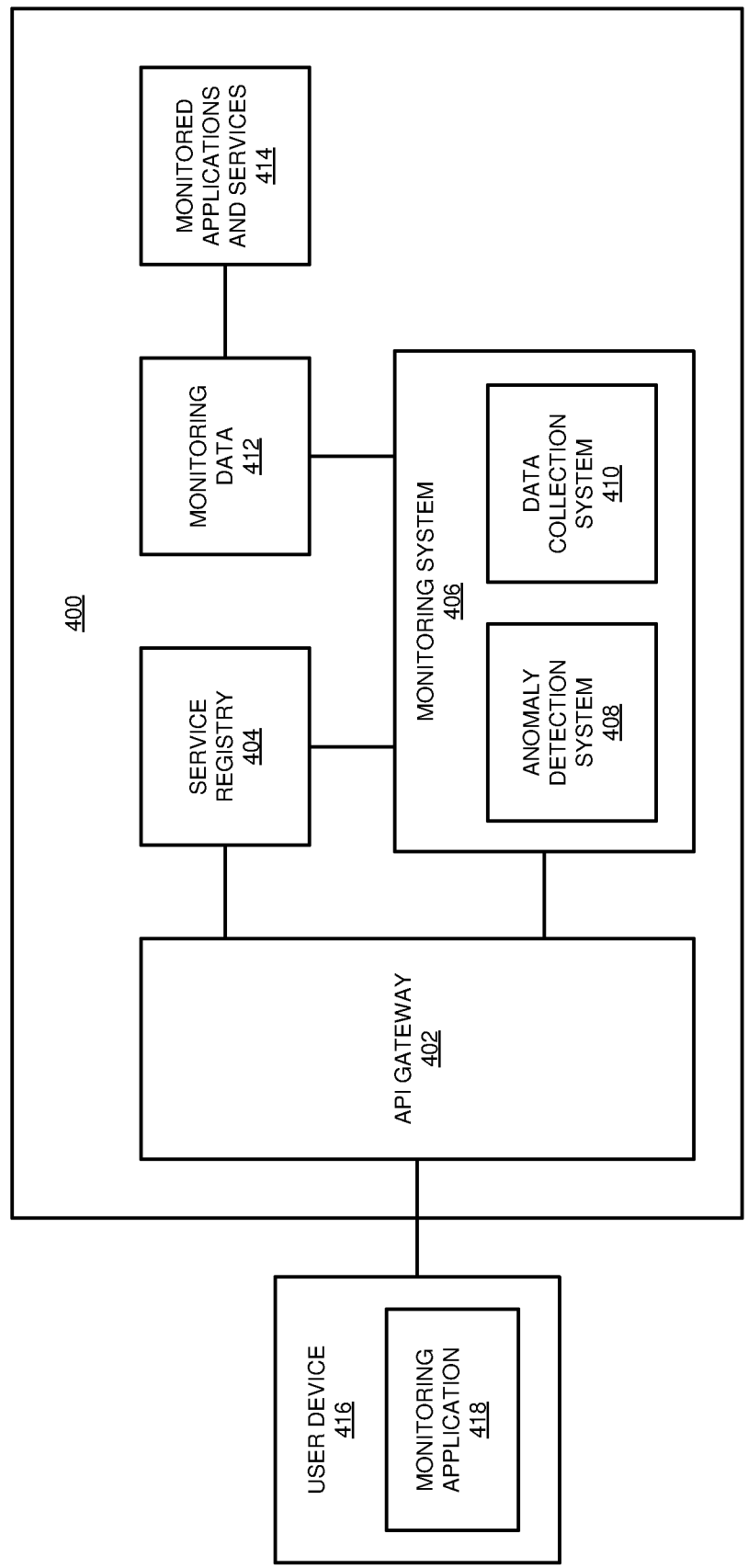
FIG. 4 depicts a block diagram of an example service infrastructure that includes a monitoring system in accordance with an illustrative embodiment.

With reference to FIG. 4, this figure depicts a block diagram of an example service infrastructure 400 that includes a monitoring system 406 in accordance with an illustrative embodiment. In some embodiments, the monitoring system 406 is deployed in workloads layer 90 of FIG. 2. By way of example, in some embodiments, monitoring system 406 is implemented as machine learning processing 96 in FIG. 2.

In the illustrated embodiment, the service infrastructure 400 provides services and service instances to a user device 416. User device 416 communicates with service infrastructure 400 via an API gateway 402. In various embodiments, service infrastructure 400 and its associated image synthesis system 406 serve multiple users and multiple tenants. A tenant is a group of users (e.g., a company) who share a common access with specific privileges to the software instance. Service infrastructure 400 ensures that tenant specific data is isolated from other tenants.

In some embodiments, user device 416 connects with API gateway 402 via any suitable network or combination of networks such as the Internet, etc. and uses any suitable communication protocols such as Wi-Fi, Bluetooth, etc. Service infrastructure 400 may be built on the basis of cloud computing. API gateway 402 provides access to client applications like monitoring system 406. API gateway 402 receives service requests issued by client applications, and creates service lookup requests based on service requests. As a non-limiting example, in an embodiment, the user device 416 is a smartphone, a laptop, or other computing device that runs a monitoring application 418. In some embodiments, the monitoring application 418 accesses the monitoring system 406 via API gateway 402.

In the illustrated embodiment, service infrastructure 400 includes a service registry 404. In some embodiments, service registry 404 looks up service instances of monitoring system 406 in response to a service lookup request such as one from API gateway 402 in response to a service request from the monitoring application 418 of the user device 416. For example, in some embodiments, the service registry 404 looks up service instances of monitoring system 406 in response to requests from the monitoring application 418 related to anomaly detection by the anomaly detection system 408 or for data collected by the data collection system 410. In some embodiments, the monitoring system 406 monitors various monitored applications and/or services 414 by receiving and analyzing monitoring data 412 that is output from the applications and/or services 414 or by sensors that monitor the applications and/or services.

In some embodiments, the service infrastructure 400 includes one or more instances of the monitoring system 406. In some such embodiments, each of the multiple instances of the monitoring system 406 run independently on multiple computing systems. In some such embodiments, monitoring system 406, as well as other service instances of monitoring system 406, are registered in service registry 404.

In some embodiments, service registry 404 maintains information about the status or health of each service instance including performance information associated each of the service instances. For example, such performance information may include several types of performance characteristics of a given service instance (e.g., cache metrics, etc.). In some embodiments, the extended service registry 404 ranks service instances based on their respective performance characteristics, and selects top-ranking service instances for classification requests. In some such embodiments, in the event that a service instance becomes unresponsive or, unhealthy, the service registry will no longer provide its address or information about this service instance to other services.

Figure 5:
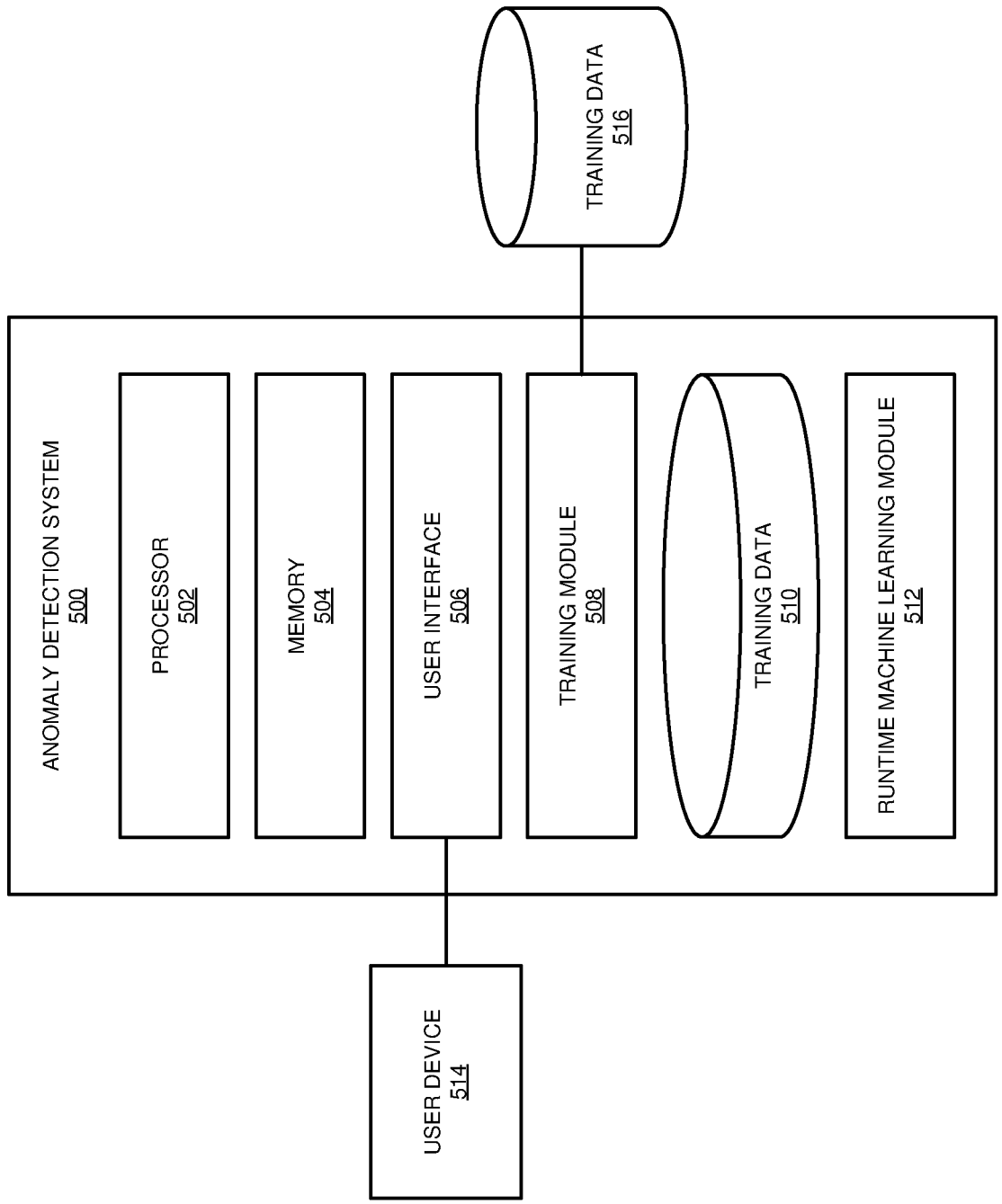
FIG. 5 depicts a block diagram of an example anomaly detection system in accordance with an illustrative embodiment.

With reference to FIG. 5, this figure depicts a block diagram of an example anomaly detection system 500 in accordance with an illustrative embodiment. In a particular embodiment, the anomaly detection system 500 is an example of the anomaly detection system 310 of FIG. 3 or anomaly detection system 408 of FIG. 4.

In some embodiments, the anomaly detection system 500 includes a processor 502, memory 504, a user interface 506, a training module 508, a training data database 510, and a runtime machine learning module 512 (or more simply referred to as machine learning module 512). In some embodiments, the machine learning module 512 includes training validation functionality for automatically and autonomously evaluating a candidate retraining dataset. For example, in some embodiments, the machine learning model 512 includes a machine learning model and evaluates candidate retraining datasets for new information that would alter the machine learning model. In alternative embodiments, the anomaly detection system 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the anomaly detection system 500 includes a processing unit ("processor") 502 to perform various computational and data processing tasks, as well as other functionality. The processing unit 502 is in communication with memory 504. The machine learning system 500 includes a user interface 506, which may include a graphic or command line interface that allows a user to communicate with the machine learning system 500. For example, in some embodiments, the user interface 506 is configured to recognize and take action in response to requests from the user device 514 related to retraining a machine learning model or related to evaluating a dataset being considered for retraining a machine learning model. In some embodiments, a user device 514 may be any known type of computing device, such as a computer, tablet, or smart phone. In some embodiments, the user interface 506 allows communication with the user device 514 via an API gateway (e.g., API gateway 402 of FIG. 4). In some embodiments, the user interface 506 receives one or more bodies of text, images, video frames, or other content for evaluation by the machine learning module 512.

In some embodiments, before the machine learning module 512 includes a machine learning model, and before the machine learning module 512 is put into production, the machine learning model is trained to perform the desired machine learning tasks by the training module 508. The training module 508 trains the machine learning model of the machine learning module 512 using local training data 510 and/or remote training data 516. In some embodiments, training data includes data points in the form of text, images, video, or other content for machine learning tasks, for example classification or natural language processing tasks. In some embodiments, the training data includes a corpus of labels for labeling the data points in the training data.

In some embodiments, the machine learning module 512 includes one or more machine learning models. In some embodiments, the machine learning module 512 includes a classification model that performs classification tasks. As a non-limiting example, in some embodiments, the machine learning module 512 includes an artificial neural network classifier model, such as a convolutional neural network (CNN), recurrent neural network (RNN), or deep neural network (DNN) classifier model, that outputs a class prediction for a given input data based on one or more features of the input data using probability. In some embodiments, the machine learning model 512 includes one or more machine learning models, non-limiting examples of which include machine learning models that perform image classification or natural-language based classification. In some embodiments, the machine learning module 512 includes a machine learning model that includes a neural network, such as an ANN, for example a CNN, RNN, or DNN. Those skilled in the art will appreciate that still further embodiments may be implemented using various other know classification or regression models.

Figure 6:
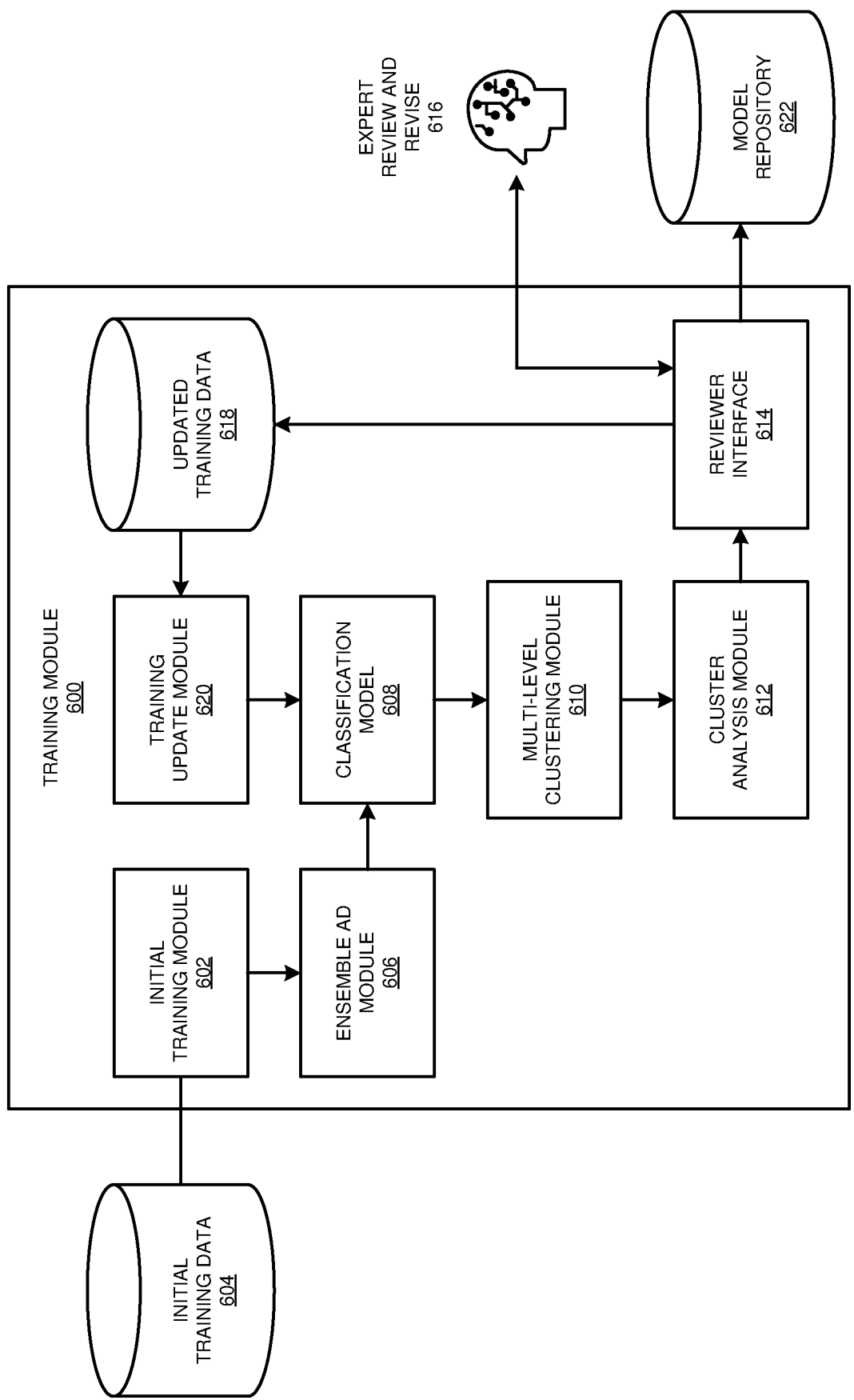
FIG. 6 depicts a block diagram of an example training module in accordance with an illustrative embodiment.

With reference to FIG. 6, this figure depicts a block diagram of an example training module 600 in accordance with an illustrative embodiment. In a particular embodiment, the training module 600 is an example of the training module 508 of FIG. 5.

In some embodiments, the training module 600 includes an initial training module 602, an ensemble anomaly detection (AD) model 606, a classification model 608, a multi-level clustering module 610, a cluster analysis module 612, a reviewer interface 614, and a training update module 620. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the initial training module 602 controls an ensemble AD model 606 to generate an initial set of training data from a plurality of data samples from monitoring data, such as monitoring data 306 of FIG. 3 or monitoring data 412 of FIG. 4. In some embodiments, the initial training module 602 stores the initial training data locally or in remote memory 604 until it can be used to initially train the classification model 608. In some embodiments, the monitoring data includes one or more of health data, performance data, availability data, and security data.

In some embodiments, the initial training module 602 generates the initial set of training data using the ensemble AD model 606. The ensemble AD model 606 comprises a plurality of pretrained classifiers, such as pretrained anomaly detection classifiers. In some embodiments, the pretrained classifiers of the ensemble AD model 606 include one or more of a gaussian mixture model (GMM), a support vector machine (SVMN) model, an isolation forest model, and a prophet model.

In some embodiments, the ensemble AD model 606 generates a plurality of classifications for the data samples by respective classifiers of the ensemble AD model 606. The ensemble AD model 606 then combines the plurality of classifications into a final classification for the data sample. For example, in some embodiments, the ensemble AD model 606 combines the plurality of classifications into a final classification by applying a majority voting algorithm to the plurality of classifications.

In some embodiments, initial training module 602 stores the final classifications as a target classifications associated with the respective input data samples in the initial set of training data samples. For example, in some embodiments, the classifications are binary classifications indicating that the input data sample is an anomaly or is not an anomaly.

In some embodiments, the initial training module 602 uses the initial training data to train the classification model 608 to identify anomalies in monitoring data. The classification outputs from the classification model 608 are output to the multi-level clustering module 610. The multi-level clustering module 610 then performs a multiple-level clustering of the plurality of data samples resulting in a plurality of clusters of sub-clusters of data samples. The clusters are then used by the cluster analysis module 612 to generate an expert review list of data samples with respective target classifications. In some embodiments, the cluster analysis module 612 generates the expert review list by selecting one representative data sample from each of the plurality of clusters. In some embodiments, the cluster analysis module 612 selects the representative data sample from each of the plurality of clusters by selecting a data sample at the center of each of the plurality of clusters. In some embodiments, the cluster analysis module 612 excludes from the expert review list a data sample from a cluster that has already been reviewed by the expert reviewer 616, which is not applicable for the initial training, but will be applicable for subsequent iterations of this training process.

The cluster analysis module 612 then provides the list to the reviewer interface 614. In response to receiving the list, the reviewer interface 614 renders the expert review list on a graphical user interface or display. The expert will review the data samples and indicate whether the classification by the classification model 608 is correct or incorrect. If incorrect, the classification is corrected and provided to the reviewer interface 614 as an updated data sample from the expert review. The updated data sample, which includes a revised target classification for a data sample, is received via the reviewer interface 614, and then provided to updated training data storage 681 and made available for the training update module 620.

In some embodiments, the training update module 620 receives the updated data samples and locates other data samples that were classified by the multi-level clustering module 610 in the same sub-cluster as the updated data sample and updates those data samples as well with the same updated information (anomaly or not anomaly) as the updated data sample from the expert reviewer.

In some embodiments, the training update module 620 then replaces the previously trained classification model 608 with a new classification model 608 that is trained using the updated training data 618 to identify anomalies in monitoring data. Once again, the classification outputs from the classification model 608 are output to the multi-level clustering module 610, and the process repeats through the multi-level clustering module 610, cluster analysis module 612, reviewer interface 614 and 616 to again generate updated training data 618 that is again used to generate another classification model 608 that is trained using the updated training data 618 to identify anomalies in monitoring data.

In some embodiments, this continues until a predetermined exit condition is satisfied, such as there being no further clusters that have no data samples that have not been expert reviewed. At that point, the trained classifier is output to the model repository 622.

Figure 7:
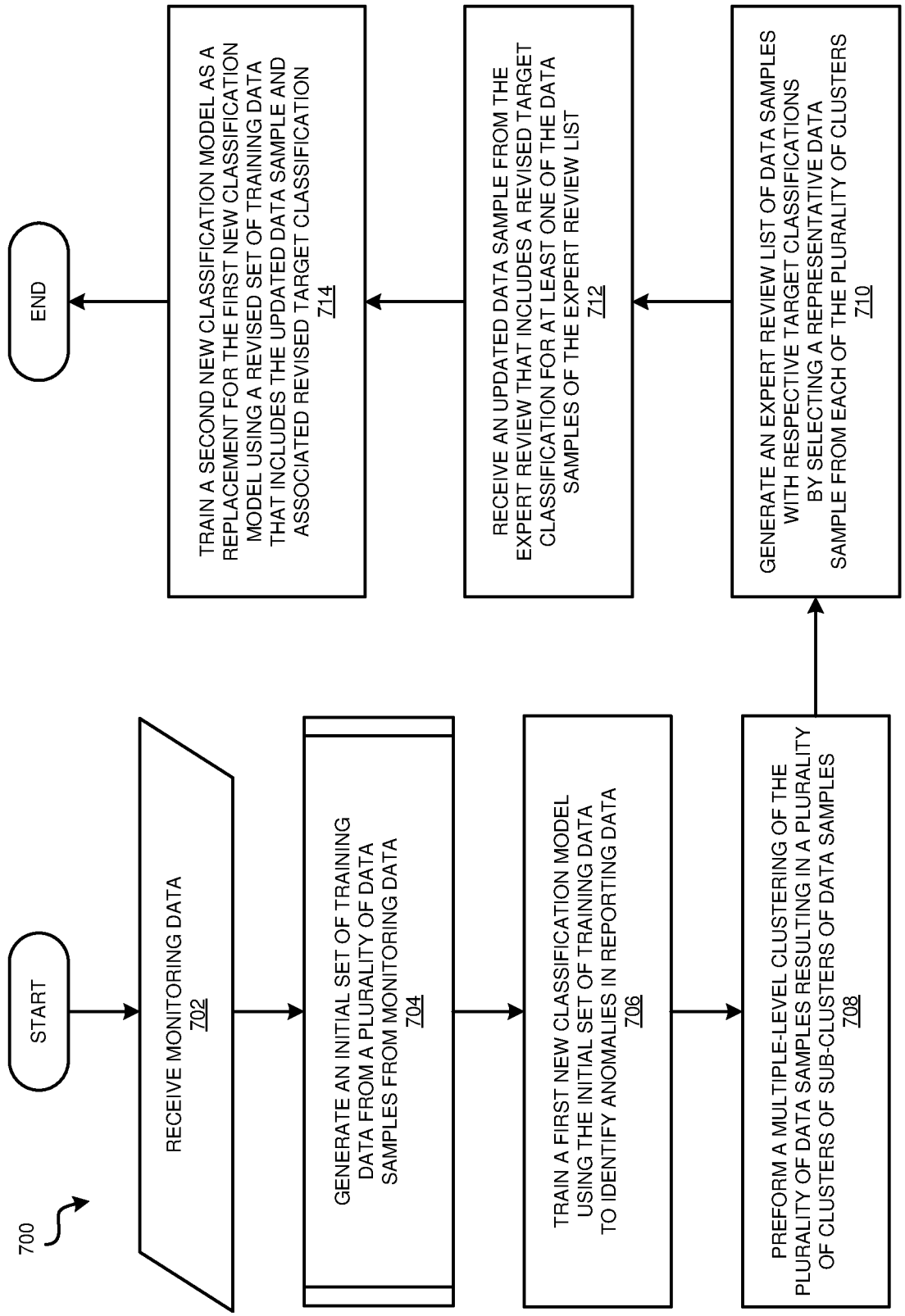
FIG. 7 depicts a schematic flow diagram of an example of an anomaly classifier training process in accordance with an illustrative embodiment.

With reference to FIG. 7, this figure depicts a schematic flow diagram of an example of an anomaly classifier training process 700 in accordance with an illustrative embodiment. In a particular embodiment, the anomaly classifier training process 700 is performed by the training module 600 of FIG. 6.

In an embodiment, at block 702, the process receives monitoring data. In some embodiments, the initial set of training data includes a plurality of data samples from monitoring data, such as monitoring data 306 of FIG. 3 or monitoring data 412 of FIG. 4. In some embodiments, the monitoring data includes one or more of health data, performance data, availability data, and security data.

Next, at block 704, the process generates an initial set of training data from a plurality of data samples from monitoring data. In some embodiments, the initial set of training data is generated using an ensemble AD model that includes a plurality of pretrained classifiers, such as pretrained anomaly detection classifiers. In some embodiments, the pretrained classifiers of the ensemble AD model include one or more of a gaussian mixture model (GMM), a support vector machine (SVMN) model, an isolation forest model, and a prophet model.

Next, at block 706, the process trains a first new classification model using the initial set of training data to identify anomalies in reporting data. The classification outputs from the classification model are output to a multi-level clustering module, and at block 708, the process performs a multiple-level clustering of the plurality of data samples resulting in a plurality of clusters of sub-clusters of data samples.

Next, at block 710, the process generates an expert review list of data samples with respective target classifications by selecting a representative data sample from each of the plurality of clusters. In some embodiments, the process selects the representative a data sample from each of the plurality of clusters by selecting a data sample at the center of each of the plurality of clusters. In some embodiments, the process excludes from the expert review list a data sample from a cluster that has already been reviewed by the expert reviewer, which is not applicable for the initial training, but will be applicable for subsequent iterations of this training process. The process includes providing the list to a reviewer interface, which renders the expert review list on a graphical user interface or display. The expert will review the data samples and indicate whether the classification by the classification model is correct or incorrect. If incorrect, the classification is corrected and provided to the reviewer interface as an updated data sample from the expert review.

Next, at block 712, the process receives an updated data sample from the expert review that includes a revised target classification for at least one of the data samples of the expert review list. The updated data sample, which includes a revised target classification for a data sample, is received via the reviewer interface, and then provided to updated training data storage and made available for the updated training for a replacement classifier. Next, at block 714, the process trains a second new classification model as a replacement for the first new classification model using a revised set of training data that includes the updated data sample and associated revised target classification.

With reference to FIG. 8, this figure depicts a schematic flow diagram of an alternative example of an initial training data generation process 800 in accordance with an illustrative embodiment. In a particular embodiment, the initial training data generation process 800 is an example of block 704 of FIG. 7.

In an embodiment, at block 802, the process generates a plurality of classifications for the data sample by respective pretrained classifiers of a plurality of pretrained classifiers. In some embodiments, the plurality of pretrained classifiers are included in an ensemble AD model. In some embodiments, the plurality of pretrained classifiers include one or more of a gaussian mixture model (GMM), a support vector machine (SVMN) model, an isolation forest model, and a prophet model. In some embodiments, the ensemble AD model generates a plurality of classifications for the data samples by respective classifiers of the ensemble AD model.

Next, at block 804, the process combines the plurality of classifications into a final classification for the data sample. In some embodiments, the ensemble AD model combines the plurality of classifications into a final classification for the data sample. For example, in some embodiments, the ensemble AD model combines the plurality of classifications into a final classification by applying a majority voting algorithm to the plurality of classifications. Next, at block 806, the process stores the final classification as a target classification associated with the data sample in the initial set of training data samples.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
generating an initial set of training data from a plurality of data samples from monitoring data, wherein the generating of the initial set of training data comprises, for each data sample of the plurality of data samples:
generating a plurality of classifications for the data sample by respective pretrained classifiers of a plurality of pretrained classifiers;
combining the plurality of classifications into a final classification for the data sample; and
storing the final classification as a target classification associated with the data sample in the initial set of training data samples;
training a first new classification model using the initial set of training data to identify anomalies in monitoring data;
performing a multiple-level clustering of the plurality of data samples resulting in a plurality of clusters of sub-clusters of data samples;
generating an expert review list of data samples with respective target classifications, wherein the generating of the expert review list comprises selecting for the expert review list a representative data sample from each of the plurality of clusters;
receiving an updated data sample from the expert review that includes a revised target classification for at least one of the data samples of the expert review list; and
training a second new classification model as a replacement for the first new classification model using a revised set of training data that includes the updated data sample and associated revised target classification.

2. The method of claim 1, wherein the plurality of pretrained classifiers comprises a plurality of pretrained anomaly detection classifiers.

3. The method of claim 2, wherein the plurality of pretrained anomaly detection classifiers include at least one model selected from the group consisting of a Gaussian Mixture Model (GMM), a support vector machine (SVM) model, an isolation forest model, and a prophet model.

4. The method of claim 1, wherein the combining of the plurality of classifications into a final classification comprises applying a majority voting algorithm to the plurality of classifications.

5. The method of claim 1, wherein the selecting of the representative data sample from each of the plurality of clusters comprises selecting a data sample at a center of each of the plurality of clusters.

6. The method of claim 1, further comprising revising data samples from a same sub-cluster as the updated data sample, wherein the revising of the data samples comprises updating the data samples to have the revised target classification.

7. The method of claim 1, further comprising rendering the expert review list on a graphical user interface.

8. The method of claim 7, wherein the receiving of the updated data sample comprises receiving the updated data sample via the graphical user interface.

9. The method of claim 1, wherein the generating of the expert review list further comprises excluding from the expert review list an updated data sample that has already been reviewed.

10. The method of claim 1, wherein the monitoring data includes one or more of health data, performance data, availability data, and security data.

11. A computer program product, the computer program product comprising one or more computer readable storage media, and program instructions collectively stored on the one or more computer readable storage media, the program instructions executable by one or more processors to cause the one or more processors to perform operations comprising:
generating an initial set of training data from a plurality of data samples from monitoring data, wherein the generating of the initial set of training data comprises, for each data sample of the plurality of data samples:
generating a plurality of classifications for the data sample by respective pretrained classifiers of a plurality of pretrained classifiers;
combining the plurality of classifications into a final classification for the data sample; and
storing the final classification as a target classification associated with the data sample in the initial set of training data samples;
training a first new classification model using the initial set of training data to identify anomalies in monitoring data;
performing a multiple-level clustering of the plurality of data samples resulting in a plurality of clusters of sub-clusters of data samples;
generating an expert review list of data samples with respective target classifications, wherein the generating of the expert review list comprises selecting for the expert review list a representative data sample from each of the plurality of clusters;
receiving an updated data sample from the expert review that includes a revised target classification for at least one of the data samples of the expert review list; and
training a second new classification model as a replacement for the first new classification model using a revised set of training data that includes the updated data sample and associated revised target classification.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
   program instructions to meter use of the program instructions associated with the request; and
   program instructions to generate an invoice based on the metered use.

14. The computer program product of claim 11, wherein the plurality of pretrained classifiers comprises a plurality of pretrained anomaly detection classifiers.

15. The computer program product of claim 14, wherein the plurality of pretrained anomaly detection classifiers include at least one model selected from the group consisting of a Gaussian Mixture Model (GMM), a support vector machine (SVM) model, an isolation forest model, and a prophet model.

16. The computer program product of claim 11, wherein the combining of the plurality of classifications into a final classification comprises applying a majority voting algorithm to the plurality of classifications.

17. A computer system comprising one or more processors and one or more computer readable storage media, and program instructions collectively stored on the one or more computer readable storage media, the program instructions executable by the one or more processors to cause the one or more processors to perform operations comprising:
   generating an initial set of training data from a plurality of data samples from monitoring data, wherein the generating of the initial set of training data comprises, for each data sample of the plurality of data samples:
      generating a plurality of classifications for the data sample by respective pretrained classifiers of a plurality of pretrained classifiers;
      combining the plurality of classifications into a final classification for the data sample; and
      storing the final classification as a target classification associated with the data sample in the initial set of training data samples;
   training a first new classification model using the initial set of training data to identify anomalies in monitoring data;
   performing a multiple-level clustering of the plurality of data samples resulting in a plurality of clusters of sub-clusters of data samples;
   generating an expert review list of data samples with respective target classifications, wherein the generating of the expert review list comprises selecting for the expert review list a representative data sample from each of the plurality of clusters;
   receiving an updated data sample from the expert review that includes a revised target classification for at least one of the data samples of the expert review list; and
   training a second new classification model as a replacement for the first new classification model using a revised set of training data that includes the updated data sample and associated revised target classification.

18. The computer system of claim 17, wherein the plurality of pretrained classifiers comprises a plurality of pretrained anomaly detection classifiers.

19. The computer system of claim 18, wherein the plurality of pretrained anomaly detection classifiers include at least one model selected from the group consisting of a Gaussian Mixture Model (GMM), a support vector machine (SVM) model, an isolation forest model, and a prophet model.

20. The computer system of claim 17, wherein the combining of the plurality of classifications into a final classification comprises applying a majority voting algorithm to the plurality of classifications.

\* \* \* \* \*